US008032020B2

(12) United States Patent
Bartolini (10) Patent No.: US 8,032,020 B2
(45) Date of Patent: Oct. 4, 2011

(54) SELF CALIBRATED OPTICAL SPECTRUM MONITOR (75) Inventor: Glenn D. Bartolini, Waltham, MA (US)

(73) Assignee: Aegis Lightwave, Inc., Woburn, MA (US)

( * ) Notice: Subject to any disclaimer, the term of this patent is extended or adjusted under 35 U.S.C. 154(b) by 685 days.

(21) Appl. No.: 11/745,426

(22) Filed: May 7, 2007

(65) Prior Publication Data

US 2007/0264010 A1    Nov. 15, 2007

Related U.S. Application Data

(60) Provisional application No. 60/746,890, filed on May 9, 2006.

(51) Int. Cl.
*H04B 10/08* (2006.01)
(52) U.S. Cl. .................... 398/9; 398/16; 398/69
(58) Field of Classification Search .............. 398/16, 398/20, 9–11, 68–69, 85; 375/296, 346, 375/349
See application file for complete search history.

(56) References Cited

U.S. PATENT DOCUMENTS

| | | | | |
|---|---|---|---|---|
| 5,132,639 A | * | 7/1992 | Blauvelt et al. | 330/149 |
| 6,144,706 A | * | 11/2000 | Sato et al. | 375/296 |
| 6,806,967 B2 | * | 10/2004 | Atia et al. | 356/519 |
| 2002/0172458 A1 | * | 11/2002 | Downie | 385/31 |
| 2004/0160596 A1 | * | 8/2004 | He et al. | 356/73.1 |
| 2006/0139646 A1 | * | 6/2006 | DiFoggio | 356/436 |
| 2009/0279828 A1 | * | 11/2009 | Nilsson et al. | 385/14 |

FOREIGN PATENT DOCUMENTS

| | | |
|---|---|---|
| EP | 1168680 A2 | 1/2002 |
| WO | 00/41351 A2 | 7/2000 |

OTHER PUBLICATIONS

"Notification of Transmittal of the International Search Report and the Written Opinion of the International Searching Authority, or the Declaration" for PCT/US07/011046, The International Searching Authority/EPO, Dec. 6, 2007, 11 Pages, Rijswijk, The Netherlands.

* cited by examiner

*Primary Examiner* — Dzung Tran
(74) *Attorney, Agent, or Firm* — Kurt Rauschenbach; Rauschenbach Patent Law Group, LLP (57) ABSTRACT

An optical spectrum monitor includes a tunable optical detector that receives optical channel monitoring signals from an optical channel and receives a control signal that selects a frequency of an optical channel monitoring signal for detection. The tunable optical detector detects the optical channel monitoring signal selected by the control signal and generates an electrical signal related to a power of the detected optical channel monitoring signal. A processor analyzes a plurality of differences between selected optical channel monitoring frequencies and their corresponding ITU frequencies and then generates the control signal at the output that corrects for at least one of systematic band offset and systematic band tilt in the optical channel monitoring frequency.

24 Claims, 7 Drawing Sheets

SELF CALIBRATED OPTICAL SPECTRUM MONITOR

The section headings used herein are for organizational purposes only and should not be construed as limiting the subject matter described in the present application.

RELATED APPLICATION SECTION

This application claims priority to U.S. Provisional Patent Application Ser. No. 60/746,890, filed May 9, 2006, and entitled "Self Calibrated Optical Spectrum Monitor." The entire application of U.S. Provisional Patent Application Ser. No. 60/746,890 is incorporated herein by reference.

BACKGROUND OF THE INVENTION

The present invention relates to optical channel monitoring devices and systems. Optical channel monitoring is increasingly being used by telecommunications carriers and multi-service operators. Optical channel monitoring is particularly important for modern optical networks that use reconfigurable and self-managed fiber-optic networks.

For example, reconfigurable add/drop multiplexers (ROADM) require an optical channel monitor. In ROADM systems, a dense wavelength division multiplexer (DWDM) channel monitor provides an inventory of incoming wavelengths to avoid "wavelength collision" with added channels, as well as an inventory of outgoing channels when the ROADM is used for multi-degree ring-to-ring switching applications. The DWDM channel monitor is also relied on to provide channel-power information to variable optical attenuator (VOA) control electronics so that added channels can be equalized with the pass-through channels.

Optical channel monitors are also needed for multi-haul fiber-optic transmission systems. Multi-haul fiber-optic transmission systems include dynamic components for automatic span configuration at setup and for self-adjustment over time to compensate for changing environmental conditions. These dynamic components usually require feedback from an optical channel monitor. Systems with such dynamic components using feedback from an optical channel monitor enable system designers to maintain tight system margins.

State-of-the-art multihaul system designs often have DWDM channel monitors, which effectively build more intelligence in the optical node. These multi-haul systems can be self-managed optical nodes that adjust for changing environmental and input conditions. Such multi-haul systems allows for automatic testing and regression-testing in various network configurations. It is anticipated that future optical networks will include sophisticated distributed intelligence that will require more embedded DWDM channel monitoring in every optical node and eventually in every optical sub-module.

Furthermore, as the number of wavelengths in an optical network increase, so does the regenerator cost as a percentage of the total DWDM system cost. Carriers are currently requiring equipment vendors to devise ways to reduce the number of regenerators. One way of eliminating regenerators in DWDM systems is to require the client line cards (for example on routers) to source long-reach DWDM channels instead of short-reach 1310 nm channels. However, removing regenerators on DWDM systems also removes the SONET/SDH monitoring capability at that network node. In such systems, DWDM channel monitors can be used for monitoring functions because they provide DWDM channel visibility regardless of the native modulation format for each DWDM wavelength.

Thus, optical channel monitors can be used to provide higher network reliability and more efficient operation, administration and provisioning. Therefore, using optical channel monitors can significantly reduce the OpEx costs for many carriers and network service providers.

BRIEF DESCRIPTION OF THE DRAWINGS

The aspects of this invention may be better understood by referring to the following description in conjunction with the accompanying drawings. Identical or similar elements in these figures may be designated by the same reference numerals. Detailed description about these similar elements may not be repeated. The drawings are not necessarily to scale. The skilled artisan will understand that the drawings, described below, are for illustration purposes only. The drawings are not intended to limit the scope of the present teachings in any way.

DETAILED DESCRIPTION

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Also, while the present teachings are described in conjunction with various embodiments and examples, it is not intended that the present teachings be limited to any such embodiments. On the contrary, the present teachings encompass various alternatives, modifications and equivalents, as will be appreciated by those of skill in the art.

It should be understood that the individual steps of the methods of the present invention may be performed in any order and/or simultaneously as long as the invention remains operable. Furthermore, it should be understood that the apparatus and methods of the present invention can include any number or all of the described embodiments as long as the invention remains operable.

Optical channel and spectrum measuring devices require periodic recalibration over their operational lifetimes. Recalibrating is typically accomplished with the use of an internal reference source. However, using an internal reference source adds substantially to the cost and complexity of the measuring device. Such internal reference sources must be highly accurate and highly stable over the lifetime of the measuring device. Using an internal reference source can reduce the reliability of the measuring device and can also increase the complexity of the reliability specifications of the system.

The measuring frequencies of optical spectrum monitoring devices usually drift as a function of time. The drift in measuring frequencies typically increases monotonically at a relatively low rate. For example, the rate of the frequency drift of currently available optical channel monitors is typically much less than 1 GHz per week under normal operating conditions. This drift in measuring frequency must be corrected for all channels being monitored.

Typical optical transmission sources used in the telecommunications industry for dense wavelength-division multiplexed systems have frequencies that remain within plus or minus 5 GHz of their desired ITU grid center frequency. An optical monitor of the present invention uses a portion of the available spectrum as a reference source. In one embodiment, the optical monitor of the present invention uses a portion of the available spectrum to provide a reference for correcting parameters, such as the frequency offset and the frequency tilt.

In one embodiment, the optical monitor according to the present invention is a self-calibrating optical monitor that corrects for frequency drift in the monitor over the operational lifetime of the monitor. The optical monitor measures and then automatically compensates for the average frequency error between the monitor and the corresponding ITU frequency. In various other embodiments, the optical monitor according to the present invention provides user data on frequency drift so that manual calibrations and/or manual adjustments can be performed.

Figure 1:
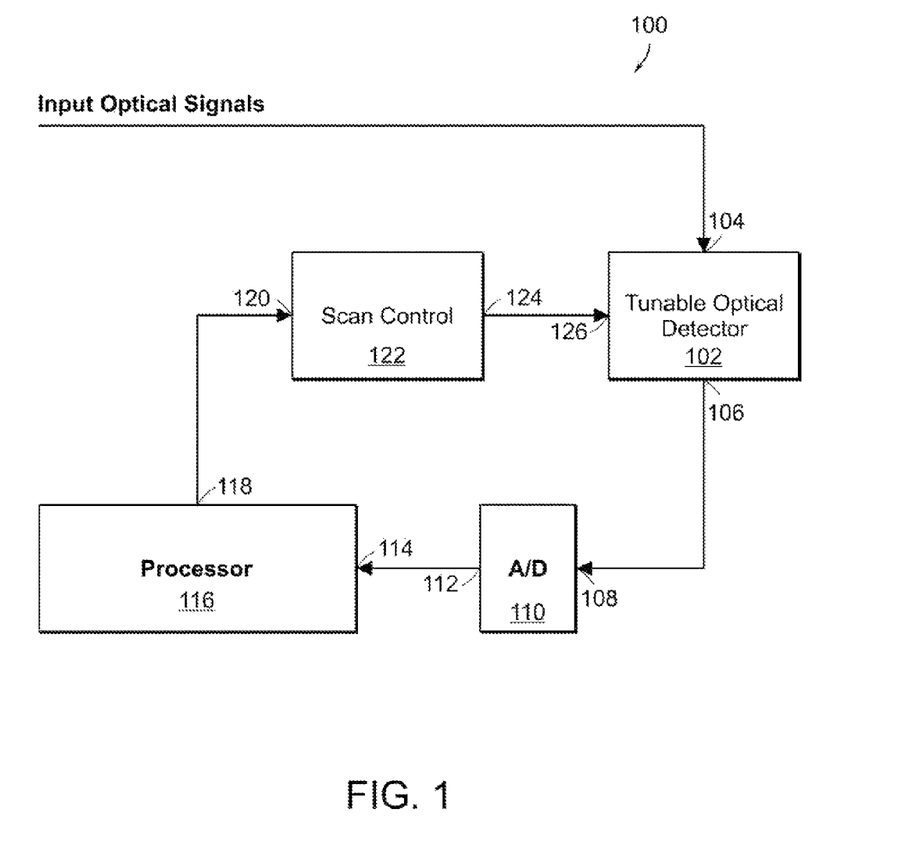
FIG. 1 illustrates a block diagram of an optical spectrum monitor for performing systematic band offset corrections and systematic band tilt corrections according to the present invention.

FIG. 1 illustrates a block diagram of an optical spectrum monitor 100 for performing systematic band offset corrections (SBOC) and systematic band tilt corrections (SBTC) according to the present invention. The term "systematic band offset correction" is defined herein to mean a correction of the average frequency difference between the measured channel frequency and the ITU center frequency of the monitored optical signal that occurs on a relatively long time scale (i.e. not instantaneous). That is, systematic band offset correction is a repeatable frequency error which is dependent upon the state of the particular measurement system.

The term "systematic band tilt correction" is defined herein to mean a correction of the linear frequency tilt across the measured frequency band that occurs on a relatively long time scale (i.e. not instantaneous). That is, systematic band tilt correction is another repeatable frequency error which is dependent upon the state of the particular measurement system. Linear frequency tilt is determined by a linear fit of the average frequency difference between the measured channel frequencies and the ITU center frequency of the monitored optical signals when plotted as a function of frequency.

The optical spectrum monitor 100 includes a tunable optical detector 102. The tunable optical detector 102 can be any type of tunable optical detector where the wavelength of the detector is electrically controllable. In one embodiment, the tunable optical detector 102 is a thermally tunable optical detector comprising an electrically controllable heating element. In this embodiment, the electrical heating element controls the temperature of the detector and, therefore, the wavelength selected by the optical detector 102.

A signal input 104 of the tunable optical detector 102 is coupled to the optical channel so that at least a portion of optical signals propagating through the channel are coupled into the signal input 104. The tunable optical detector 102 generates an electrical signal at an output 106 in response to detecting the optical signals propagating through the channel.

The output 106 of the tunable optical detector 102 is electrically connected to an input 108 of an analog-to-digital converter 110. The analog-to-digital converter 110 converts the analog electrical signal generated by the tunable optical detector 102 in response to detecting the optical signals propagating through the channel to a digital signal suitable for digital processing.

An output 112 of the analog-to-digital converter 110 is electrically connected to a data input 114 of a processor 116. The processor 116 can be any type of processor, such as a general purpose processor, a digital signal processor, or a computer. However, in many embodiments, the processor 116 is a digital signal processor. The processor 116 executes the algorithms for the methods described herein to determine the systematic band offset corrections and the systematic band tilt corrections according to the present invention.

An optical monitor according to the present invention uses an algorithm for performing at least one of systematic band offset corrections and systematic band tilt corrections. The processor 116 generates a control signal determined by an algorithm according to the present invention at an output 118 that is used to select the wavelength of the tunable optical detector 102. The output 118 of the processor 116 is electrically connected to a control input 120 of a scan controller 122. The scan controller 122 generates a signal that selects the desired wavelength of the tunable optical detector 102 at an output 124 in response to the signal received at the control input 120.

Figure 2:
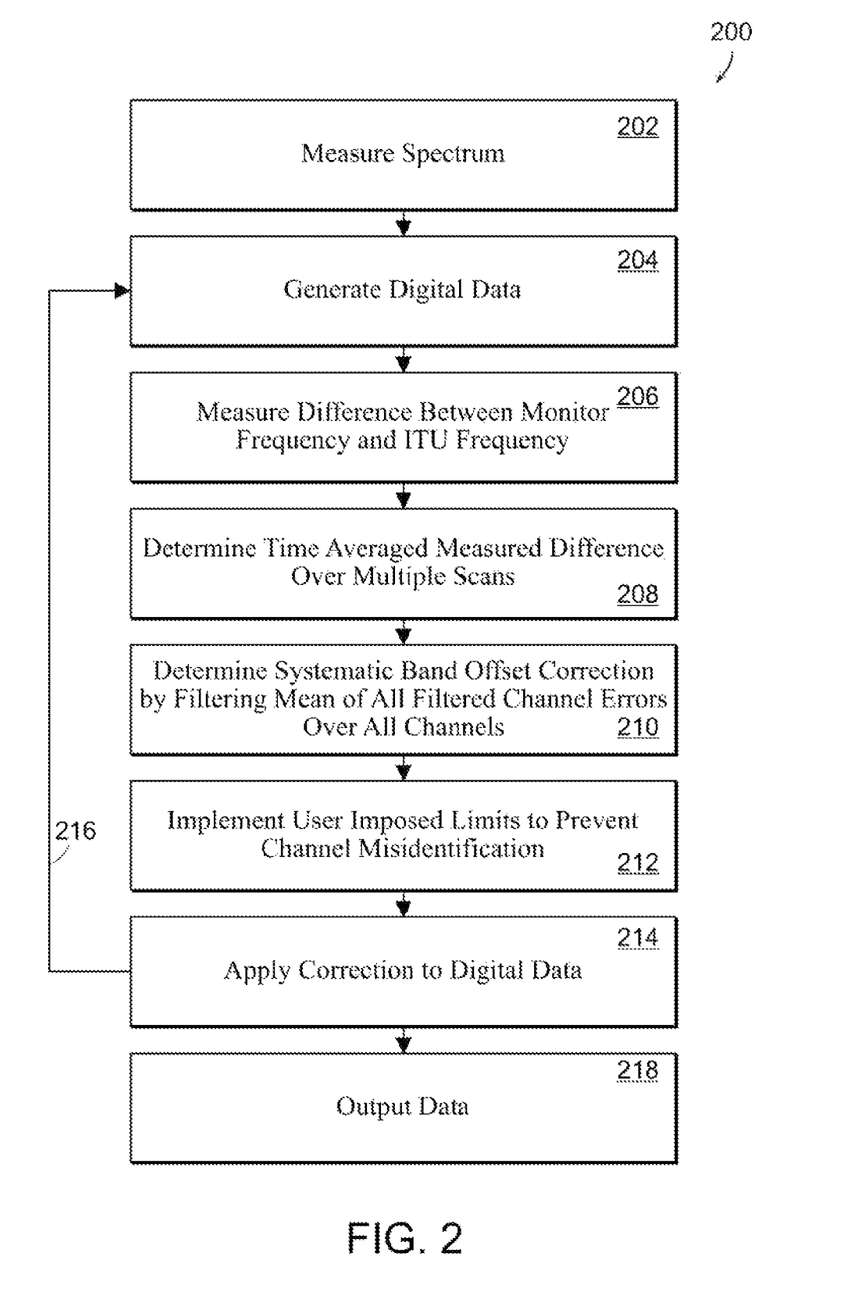
FIG. 2 illustrates a flow chart of a method for performing systematic band offset corrections according to the present invention using the optical spectrum monitor described in connection with FIG. 1.

FIG. 2 illustrates a flow chart 200 of a method for performing systematic band offset corrections according to the present invention using the optical spectrum monitor 100 described in connection with FIG. 1. Systematic band offset is generally caused by changes in both the tunable optical filter 102 characteristics and changes in the electronic devices in the optical spectrum monitor 100 that occur during normal aging. The goal of the systematic band offset correction according to the present invention is to perform corrections at a rate that is faster than the rate of the frequency drift that occurs due to changes in filter characteristics of the tunable optical detector 102 and due to changes in the electronic devices in the optical spectrum monitor 100 that are caused by normal aging effects. Instantaneous effects that occur on a time scale that is small compared with the time scale of the normal aging effects are typically not corrected by this method. Consequently, changes that occur during power up, maintenance, and testing will not be corrected by this method.

In a first step 202, the optical spectrum is measured. The measured optical spectrum is represented as the analog optical power as a function of wavelength or frequency. In a second step 204, digital data is generated from the measured optical spectrum using an analog-to-digital converter. In a third step 206, the difference between the optical channel monitor frequency and the corresponding ITU frequency is measured.

In a fourth step 208, the measured differences between the optical channel monitor frequency and the corresponding ITU frequency determined in the third step 206 are then time averaged over multiple scans using digital filtering techniques. For example, in some embodiments, the measured differences are time averaged using an infinite impulse response (IIR) digital filter implemented with a floating point DSP processor. There are numerous other types of filters that are well known in the art which can be used to time average the measured differences. The filtering in the fourth step 208 reduces the effects of fluctuations in the measurements for events that occur on a periodic basis.

The method of performing systematic band offset corrections according to the present invention is designed to correct for long term drifting caused by aging of optical and electronic components. Therefore, in many embodiments, the measured differences between the optical channel monitor frequency and the corresponding ITU frequency are time averaged at a slow rate. In some embodiments, the time average filtering performed in the fourth step 208 is performed on individual channel drift measurements. In some embodiments, the time average filtering performed in the fourth step 208 is performed on the mean drift data for all valid channels.

In some embodiments, a means for determining the validity of channels can be included in the algorithm used to determine the mean drift. In addition, in some embodiments, the bandwidth of the filter is chosen to directly limit the systematic band offset correction to some predetermined limit. For example, the bandwidth of an IIR filter can be configured to limit the systematic band offset correction to be constrained to within the expected offset rate of the device over time.

In a fifth step 210, the systematic band offset correction values are determined by filtering the mean of all filtered channel errors. The mean of all filtered channel errors is filtered with a second filter, such as a second IIR filter. Numerous other filters known in the art can be used to reduce the effects of fluctuations in the measurement data. In some commercial embodiments, the algorithm implementing this method can be disabled by the operator if desired.

In a sixth step 212, user imposed limits are placed on the systematic band offset correction in order to prevent possible channel misidentification. For example, one possible user rule can be to set the maximum applied systematic band offset correction equal to plus or minus 100 Gmaximum applied systematic band offset correction to a small percentage of the total spectrum scanned by the tunable optical detector 102. For example, with this user rule, the maximum applied systematic band offset correction can be set equal to plus or minus 1-2% of the total spectrum scanned by the tunable optical detector 102.

In a seventh step 214, the systematic band offset correction is applied to the digital data to create corrected digital data that includes the systematic band offset correction. In an eighth step 216, the corrected digital data is feedback to the second step 204 of the method where the digital data is generated. The corrections are then used in generating the digital data for the algorithm. In a ninth step 218, the corrected digital data is output to the user. That is, the corrected digital data is made available to the user. This allows the user to manually inspect and verify the integrity of the data. For example, the user can manually verify that transmitted channels are not missing from the data.

In some embodiments, an optical monitor according to the present invention uses an algorithm for systematic band tilt correction (SBTC). The algorithm for systematic band tilt correction can be used in conjunction with the algorithm for systematic band offset correction that is described in connection with FIG. 2 or can be use independently. Systematic band tilt is generally caused by changes in the electronic devices that occur during normal aging. The optical channel monitor frequency tilt typically increases monotonically over time and at a very slow rate.

The algorithm for systematic band tilt correction according to the present invention is used to correct for long-term band tilt errors. The goal of the systematic band tilt correction according to the present invention is to perform corrections at a rate that is faster than the rate of frequency drift that occurs due to changes in the electronic devices that are caused by aging effects. Instantaneous effects that occur on a time scale that is small compared with the time scale of the aging effects are typically not corrected by this method. Consequently, changes that occur during power up, maintenance, and testing are not corrected by this method.

Figure 3:
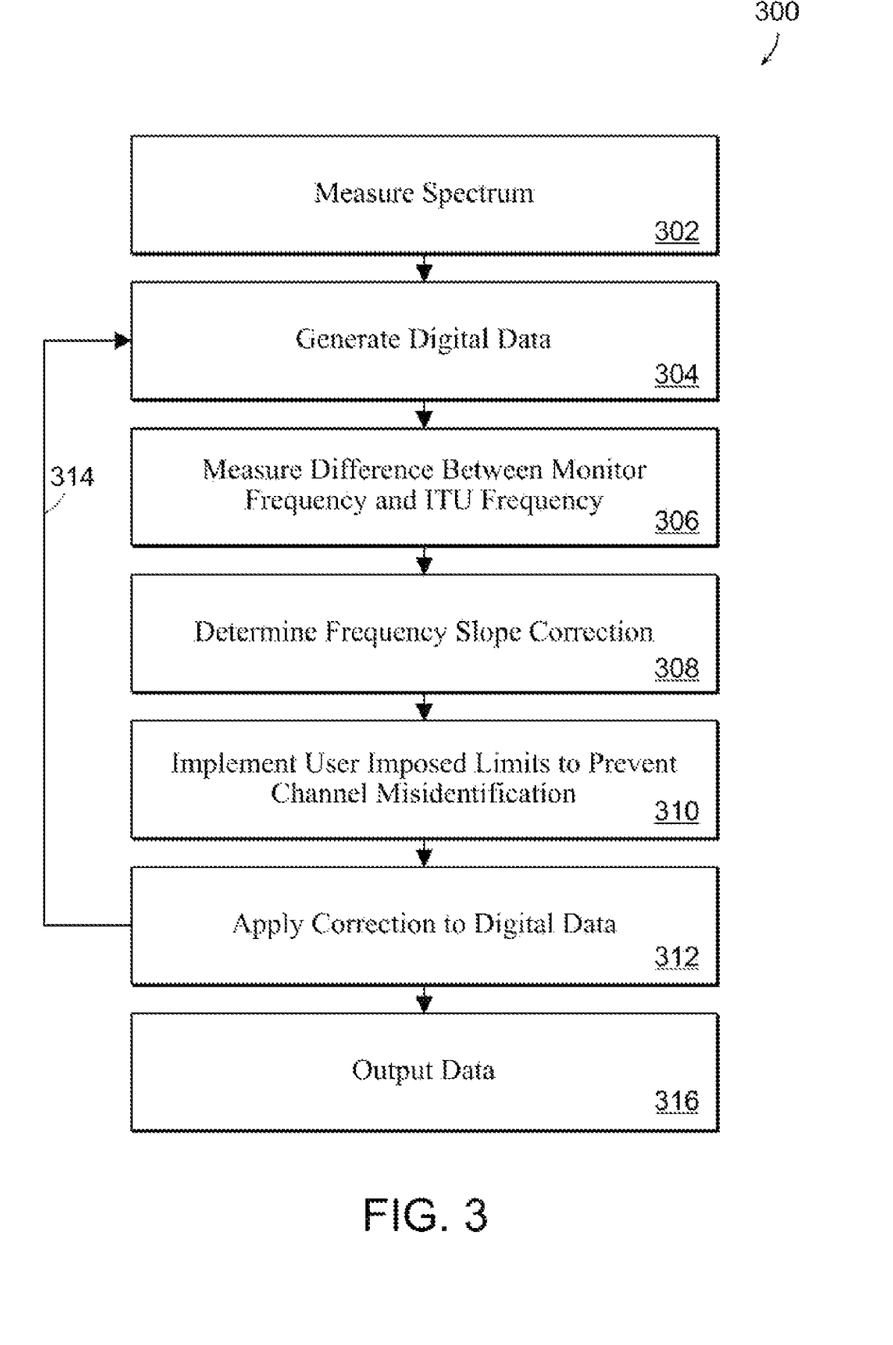
FIG. 3 illustrates a flow chart of a method for performing systematic band tilt corrections according to the present invention using the optical spectrum monitor described in connection with FIG. 1.

FIG. 3 illustrates a flow chart 300 of a method for performing systematic band tilt corrections according to the present invention using the optical spectrum monitor 100 described in connection with FIG. 1. In a first step 302, the optical spectrum is measured. The measured optical spectrum is represented as the analog optical power as a function of wavelength or frequency. In a second step 304, digital data is generated from the measured optical spectrum using an analog-to-digital converter. In a third step 306, the difference between the optical channel monitor frequency and the corresponding ITU frequency is measured.

In a fourth step 308, a frequency slope correction is determined. In one embodiment, the frequency slope correction is determined by first fitting a line through the data obtained in the third step 306 for the difference between the optical channel monitor frequency and the corresponding ITU frequency as a function of the channel number as described in connection with FIG. 4B. The channel number is a measure of increasing wavelength or decreasing frequency. The slope correction can be any order, such as a first order, a second order, or a third order. In other embodiments, other methods, such as linear interpolation of the data obtained for the measured difference between monitor frequency and ITU frequency are used to determine the frequency slope correction.

In some embodiments, the measured optical spectrum is analyzed to determine if all the data for the difference between the optical channel monitor frequency and the corresponding ITU frequency is valid data. In these embodiments, the data that is suspected to be invalid is not used to determine the frequency slope correction.

In a fifth step 310, the user can impose limits in order to prevent channel misidentification. User imposed limits are placed on the systematic band tilt correction in order to prevent compensation outside of the calibration range of the tunable optical detector 102. For example, the maximum applied systematic band tilt correction can be limited In some embodiments, constraints are included for particular channels that must be detected in order for the frequency slope correction to be applied. Also, in some embodiments, constraints for the maximum cumulative frequency slope correction over the lifetime of the optical channel monitoring device are included.

For example, one possible user rule is to set the maximum applied systematic band tilt correction equal to plus or minus 100 Grange of the tunable optical detector 102 maximum applied systematic band tilt correction to a small percentage of the total spectrum scanned by the tunable optical detector 102. That is, another possible user rule is to set the maximum applied systematic band tilt correction equal to plus or minus 1-2% of the total spectrum scanned by the tunable optical detector 102.

In a sixth step 312, the systematic band tilt correction is applied to the digital data to create corrected digital data. In a seventh step 314, the corrected digital data is feedback to the second step 304 of the method where the digital data is generated. The corrections are then used in generating the digital data for the algorithm. In an eighth step 316, the corrected digital data is output to the user. That is, the corrected digital data is made available to the user in some form. This allows the user to manually inspect and verify the integrity of the data. For example, the user can manually verify that transmitted channels are not missing from the data.

Figure 4A:
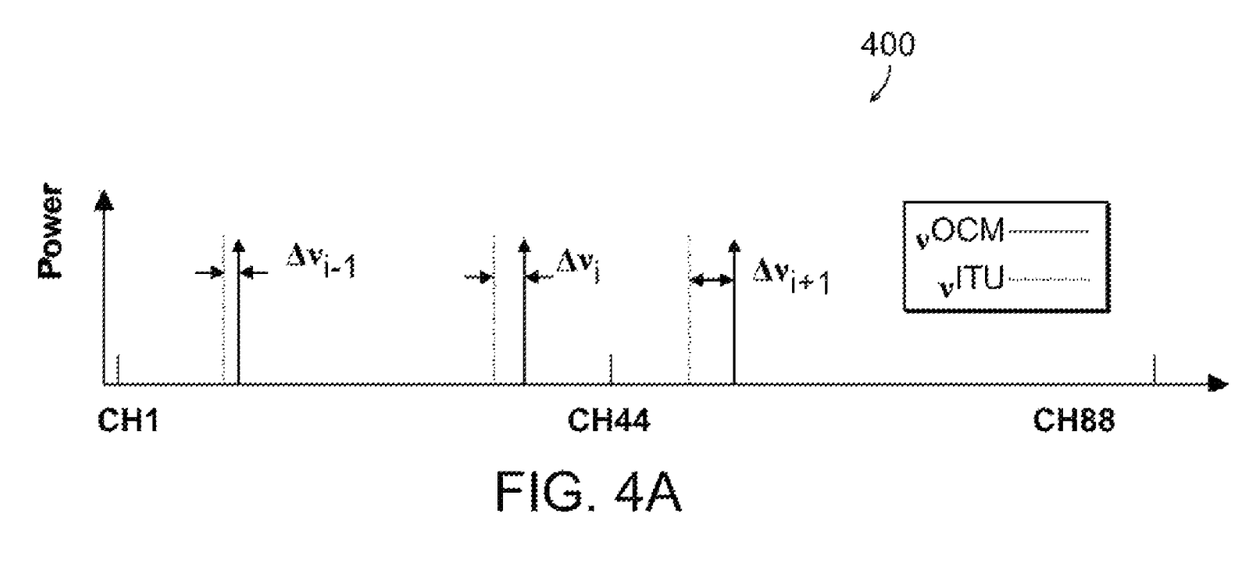
FIG. 4A is a plot of optical power as a function of the channel number that illustrates data for the differences between the monitor frequencies and the corresponding ITU frequencies.

FIG. 4A is a plot 400 of optical power as a function of the channel number that illustrates data for the differences between the monitor frequencies and the corresponding ITU frequencies. In the plot 400, the channel wavelength increases as the channel number increases, or equivalently, the channel frequency decreases as the channel number increases. The plot 400 illustrates the difference between the optical monitoring frequency and the corresponding ITU frequency for a spectrum of channels (i.e. channel 1 to channel 88). The plot 400 indicates that the difference between the optical monitoring frequency and the corresponding ITU frequency increases with increasing channel number.

Figure 4B:
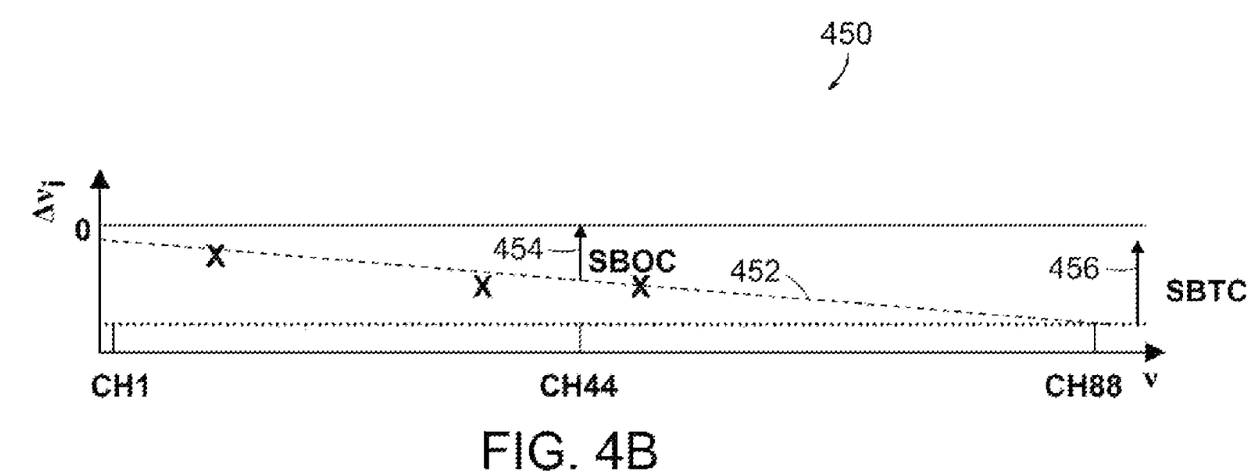
FIG. 4B is a plot of frequency difference between the optical monitoring frequency and the corresponding ITU frequency as a function of the channel number.

FIG. 4B is a plot 450 of frequency difference between the optical monitoring frequency and the corresponding ITU frequency as a function of the channel number. In the plot 450, the channel wavelength increases as the channel number increases, or equivalently, the channel frequency decreases as the channel number increases. The plot 450 indicates that the band tilt increase from near zero at the first channel (channel 1) as a function of increasing channel number to a maximum value at the last channel (channel 88 in the example shown in FIG. 4B).

The plot 450 can be used to determine the systematic band offset correction and the systematic band tilt correction according to the present invention. A line 452 is fitted to the frequency difference values as a function of the channel number or equivalently as a function of the wavelength or frequency of the tunable optical detector 102. A slope and a Y-intercept can be determined from the line 452. The systematic band offset correction 454 and the systematic band tilt 456 correction for this example are illustrated in FIG. 4B.

The systematic band offset correction 454 can be determined from the slope and the Y-intercept of the line 452 and the total number of channels in the measurement band of the tunable optical detector with the following equation:

$$SBOC = -mN/2 - b,$$

where m is the slope, N is the total number of channels in the measurement band, which for this example is 88, and b is the Y-intercept.

The systematic band tilt correction 456 can be determined from just the slope of the line 452 and the total number of channels in the measurement band with the following equation:

$$SBTC = m(1-N),$$

where m is the slope, N is the total number of channels in the measurement band, which for this example is 88.

Figure 5A:
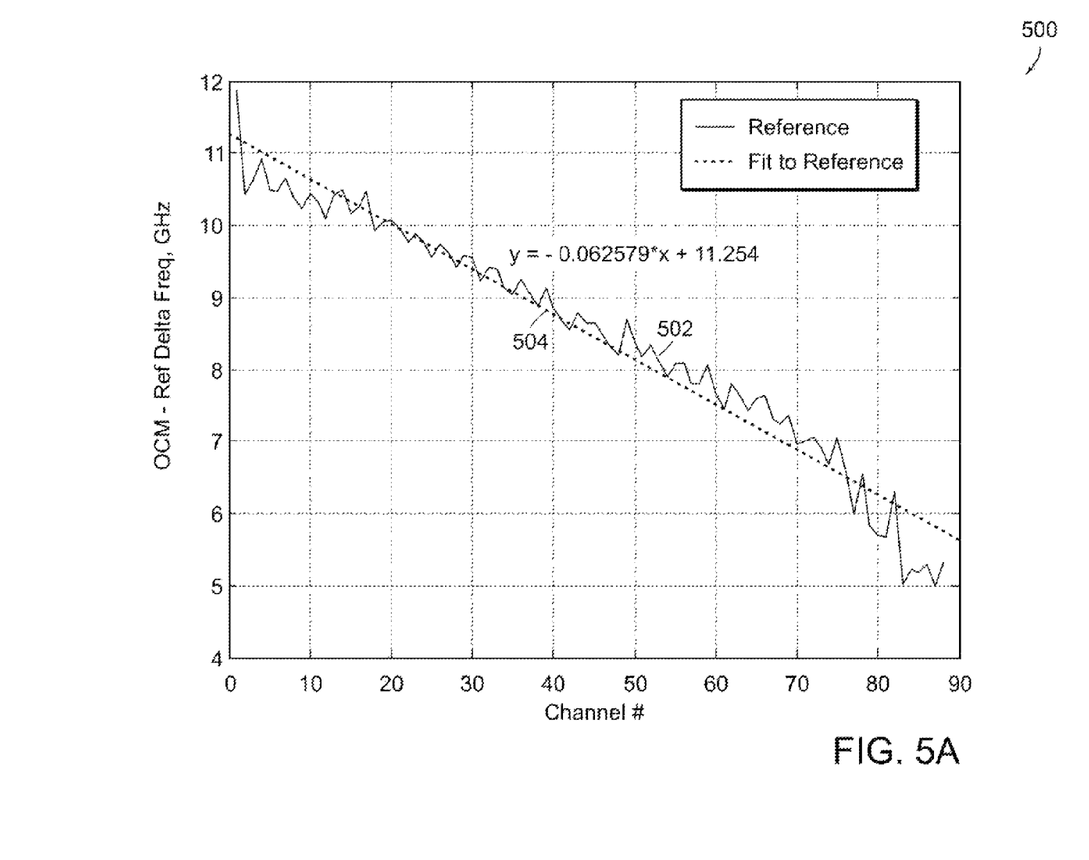
FIG. 5A illustrates a plot of measured data for the frequency difference between the optical monitoring frequency and the corresponding ITU frequency as a function of the channel number.

FIG. 5A illustrates a plot 500 of measured data for the frequency difference between the optical monitoring frequency and the corresponding ITU frequency as a function of the channel number. The plot 500 shows the uncorrected measured data 502 for the frequency difference between the optical monitoring frequency and the corresponding ITU frequency. A line 504 is fitted to the uncorrected measured data 502 for the frequency difference. The plot 500 indicates that the difference between the optical monitoring frequency and the corresponding ITU frequency before applying a systematic band offset correction and a systematic band tilt correction according to the present invention is in the range of approximately 5-12 GHz.

Figure 5B:
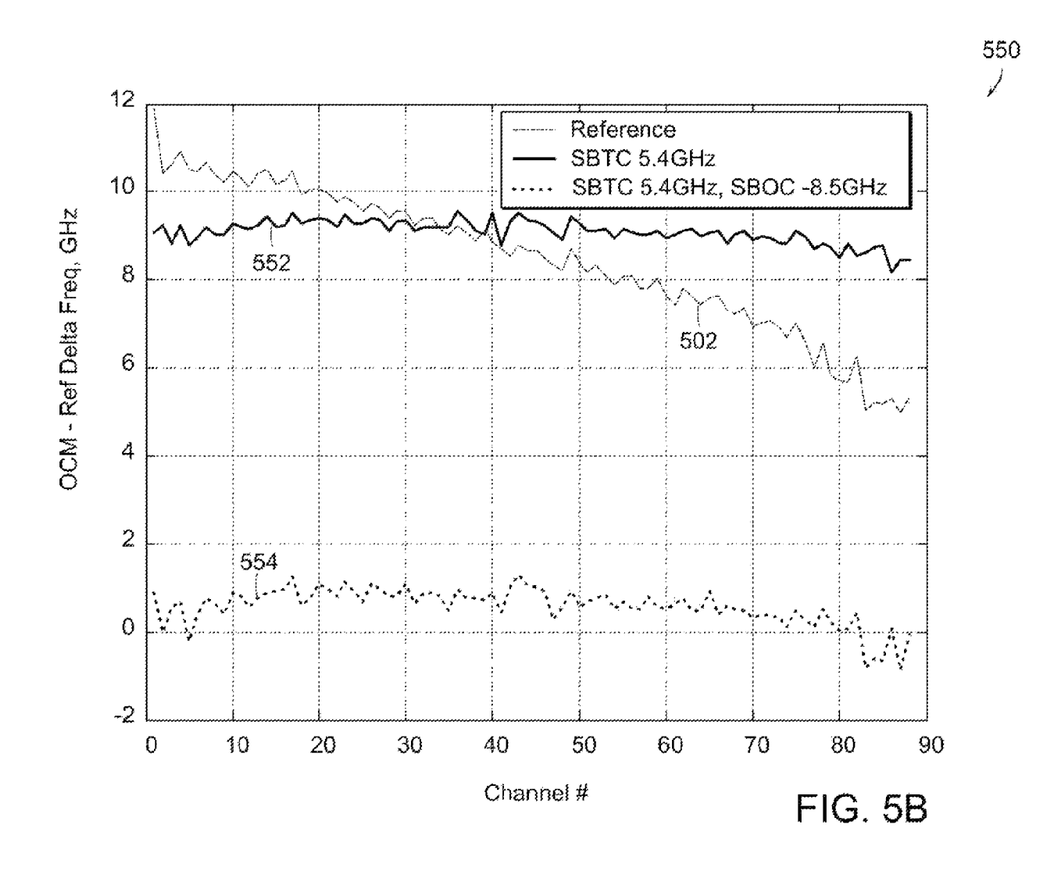
FIG. 5B illustrates a plot of measured data for the frequency difference between the optical monitoring frequency and the corresponding ITU frequency as a function of the channel number with systematic band offset and systematic band tilt corrections applied to the data according to the present invention.

FIG. 5B illustrates a plot 550 of measured data for the frequency difference between the optical monitoring frequency and the corresponding ITU frequency as a function of the channel number with systematic band offset and systematic band tilt corrections applied to the data according to the present invention. The uncorrected measured data 502 shown in FIG. 5A for the frequency difference between the optical monitoring frequency and the corresponding ITU frequency is shown on the plot 550.

In addition, the plot 550 shows corrected data for the frequency difference between the optical monitoring frequency and the corresponding ITU frequency as a function of the channel number. The corrected data 552 is presented for the frequency difference between the optical monitoring frequency and the corresponding ITU frequency with a systematic band tilt correction equal to 5.4 GHz. The corrected data 554 is presented for the frequency difference between the optical monitoring frequency and the corresponding ITU frequency with both a systematic band tilt correction equal to 5.4 GHz and a systematic band offset correction equal to −8.5 GHz. Thus, the plot 550 shows that the difference between the optical monitoring frequency and the corresponding ITU frequency after applying the SBOC and SBTC corrections with the methods of the present invention is less than about 1.5 GHz.

EQUIVALENTS

While the present teachings are described in conjunction with various embodiments and examples, it is not intended that the present teachings be limited to such embodiments. On the contrary, the present teachings encompass various alternatives, modifications and equivalents, as will be appreciated by those of skill in the art, may be made therein without departing from the spirit and scope of the invention.

What is claimed is:

1. A self-calibrating optical spectrum monitor comprising:
  a) a tunable optical detector comprising a tunable filter and an optical detector having a signal input that receives optical channel monitoring signals from an optical channel and a control input that receives a control signal that selects a frequency of an optical channel monitoring signal for detection, the tunable optical detector detecting the optical channel monitoring signal selected by the control signal and generating an electrical signal related to a power of the detected optical channel monitoring signal; and
  b) a processor having an input that is electrically connected to an output of the tunable optical detector and an output that is coupled to the control input of the tunable optical detector, the processor measuring a plurality of differences between selected optical channel monitoring frequencies and their corresponding ITU center frequencies and then generating the control signal at the output in response to the measured differences in frequencies, the control signal correcting for at least one of systematic band offset and systematic band tilt in the optical channel monitoring frequencies at a time that is faster than a rate of frequency drift in the optical spectrum monitor caused by changes in at least one of electrical characteristics of the optical spectrum monitor and filter characteristics of the tunable optical detector resulting from aging effects.

2. The optical spectrum monitor of claim 1 wherein the tunable optical detector comprises a thermally tunable optical detector.

3. The optical spectrum monitor of claim 1 wherein the processor comprises a digital signal processor.

4. The optical spectrum monitor of claim 1 wherein the control signal generated by the processor corrects for both systematic band offset and for systematic band tilt in the optical channel monitoring frequency.

5. The optical spectrum monitor of claim 1 wherein the processor generates the control signal that corrects for the at least one of systematic band offset and systematic band tilt in the optical channel monitoring frequency at a time that is faster than a rate of frequency drift in the optical spectrum monitor caused by changes in the electrical characteristics resulting from aging effects.

6. The optical spectrum monitor of claim 1 wherein the generating of the control signal at the output of the processor in response to the measured differences in frequencies comprises time average filtering the plurality of differences between the selected optical channel monitoring frequencies and their corresponding expected ITU frequencies.

7. The optical spectrum monitor of claim 1 wherein the processor imposes user defined limits on at least one of the systematic band offset correction and the systematic band tilt correction.

8. The optical spectrum monitor of claim 1 further comprising a scan control unit having an input that is electrically connected to the output of the processor and an output that is electrically connected to the input of the tunable optical detector, the scan control unit receiving the control signal generated by the processor and generating a signal that causes the tunable optical detector to select the optical channel monitoring signal for detection.

9. The optical spectrum monitor of claim 1 further comprising an analog-to-digital converter having an input that is electrically connected to the output of the tunable optical detector and an output that is electrically connected to the input of the processor, the analog-to-digital converter converting the signal generated by the tunable optical detector to a digital signal suitable of digital processing in the processor.

10. A method of self-calibrating an optical channel monitor, the method comprising:
a) obtaining a plurality of optical channel monitoring frequencies from an optical transmission system using a tunable optical detector in the optical channel monitor;
b) comparing the plurality of optical channel monitoring frequencies with their corresponding ITU center frequencies and obtaining differences between selected optical channel monitoring frequencies and their corresponding ITU center frequencies;
c) determining at least one of a frequency offset correction and a frequency tilt correction from the differences between selected optical channel monitoring frequencies and their corresponding ITU center frequencies using a processor in the optical channel monitor; and
d) applying the at least one of the frequency offset correction and the frequency tilt correction to the plurality of optical channel monitoring frequencies at a time that is faster than a rate of frequency drift in the optical channel monitor caused by changes in at least one of electrical characteristics of the optical channel monitor and filter characteristics of the tunable optical detector in the optical channel monitor resulting from aging effects.

11. The method of claim 10 wherein the determining the at least one of the frequency offset correction and the frequency tilt correction comprises determining a frequency offset correction from the measured differences between the plurality of optical channel monitoring frequencies and their corresponding ITU center frequencies.

12. The method of claim 10 wherein the determining the at least one of the frequency offset correction and the frequency tilt correction comprises determining a frequency tilt correction from the measured differences between the plurality of optical channel monitoring frequencies and their corresponding ITU center frequencies.

13. The method of claim 10 wherein the determining the at least one of a frequency offset correction and a frequency tilt correction comprises time averaging the measured differences between the plurality of optical channel monitoring frequencies and their corresponding ITU center frequencies.

14. The method of claim 13 wherein the time averaging is performed for all measured differences between the plurality of optical channel monitoring frequencies and their corresponding ITU center frequencies.

15. The method of claim 13 wherein the time average filtering is performed for individual measured differences between the plurality of optical channel monitoring frequencies and their corresponding ITU center frequencies.

16. The method of claim 13 wherein the time average filtering is performed for mean measured differences between the plurality of optical channel monitoring frequencies and their corresponding ITU center frequencies.

17. The method of claim 10 wherein the determining the at least one of the frequency offset correction and the frequency tilt correction comprises determining a slope of a line fitted through the differences between the plurality of optical channel monitoring frequencies and their corresponding ITU center frequencies as a function of the plurality of channels.

18. The method of claim 10 wherein the determining at least one of the frequency offset correction and the frequency tilt correction comprises determining a slope and a Y-intercept of a line fitted through the measured differences between the plurality of optical channel monitoring frequencies and their corresponding ITU center frequencies as a function of the plurality of channels.

19. The method of claim 10 further comprising applying user defined limits to the at least one of the frequency offset correction and the frequency tilt correction.

20. The method of claim 19 wherein the user defined limits comprise plus or minus 100 Gfrequency tilt correction.

21. The method of claim 19 wherein the user defined limits comprise less than total spectrum of the plurality of optical channel monitoring frequencies.

22. The method of claim 10 further comprising determining channel misidentification from the at least one of the frequency offset correction and the frequency tilt correction.

23. The method of claim 10 further comprising providing the at least one of the frequency offset correction and the frequency tilt correction to a user interface.

24. An optical spectrum monitor comprising:
a) a means for measuring optical powers and optical frequencies of a plurality of optical signals in an optical fiber of an optical transmission system using a tunable optical detector in the optical spectrum monitor;
b) a means for determining at least one of a frequency offset correction and a frequency tilt correction from differences between selected optical channel monitoring frequencies and their corresponding ITU center frequencies using a processor in the optical spectrum monitor; and c) a means for applying the at least one of the frequency offset correction and the frequency tilt correction to the plurality of optical channel monitoring frequency in order to calibrate the optical channel monitor at a time that is faster than a rate of frequency drift in the optical spectrum monitor caused by changes in at least one of electrical characteristics of the optical spectrum monitor and filter characteristics of the tunable optical detector in the optical channel spectrum resulting from aging effects.

* * * * *